No. 718,239. PATENTED JAN. 13, 1903.
N. E. BAILEY.
DRAFT EQUALIZER.
APPLICATION FILED MAY 31, 1902.
NO MODEL.
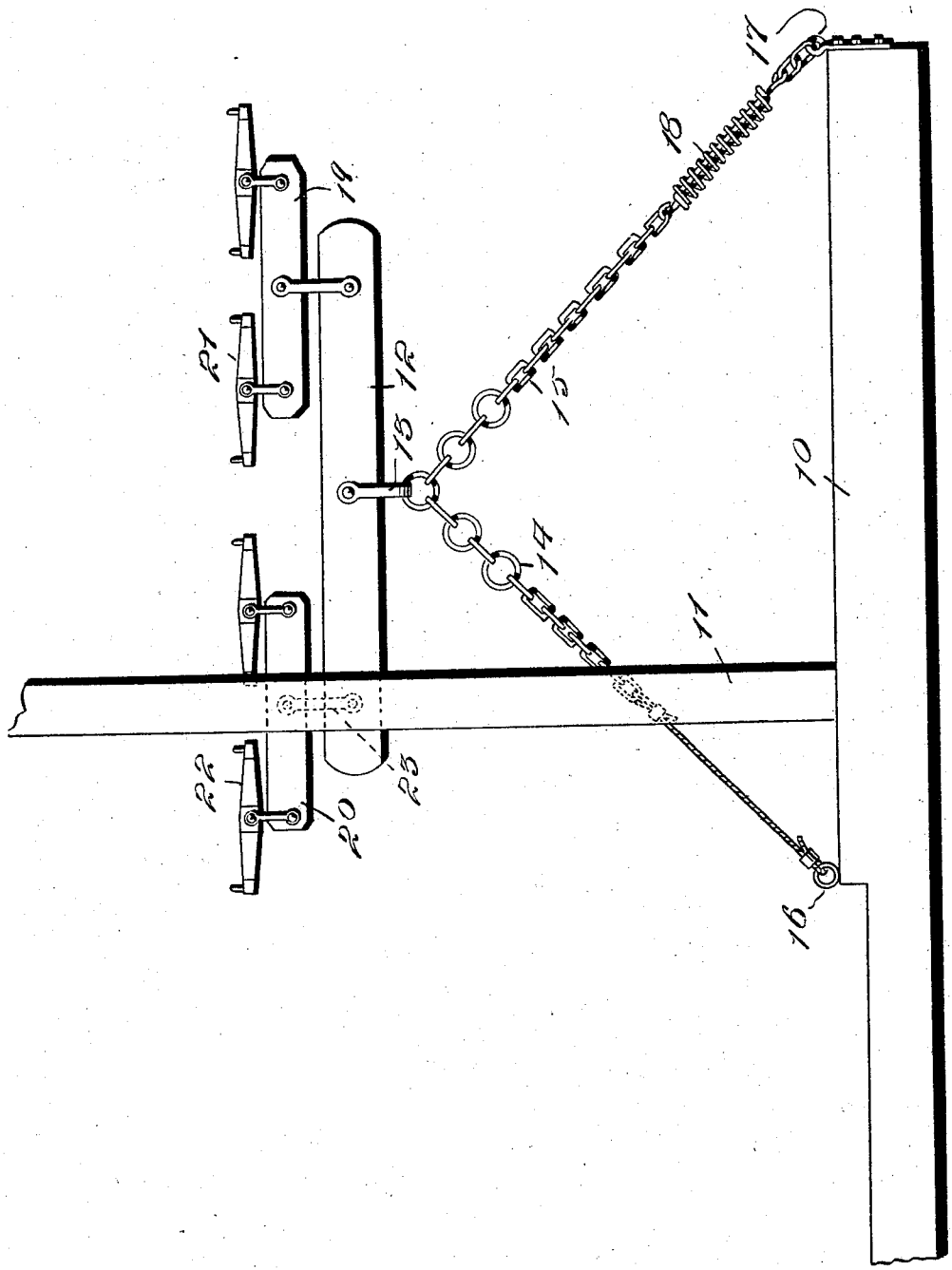

UNITED STATES PATENT OFFICE.

NELSON E. BAILEY, OF LAKE CRYSTAL, MINNESOTA, ASSIGNOR OF ONE-HALF TO WILLIAM F. KEEHN, OF LAKE CRYSTAL, MINNESOTA.

DRAFT-EQUALIZER.

SPECIFICATION forming part of Letters Patent No. 718,239, dated January 13, 1903.

Application filed May 31, 1902. Serial No. 109,731. (No model.)

*To all whom it may concern:*

Be it known that I, NELSON E. BAILEY, a citizen of the United States, residing at Lake Crystal, in the county of Blue Earth and State of Minnesota, have invented a new and useful Draft-Equalizer, of which the following is a specification.

This invention relates to draft-equalizers employed in connection with harvesters, mowing-machines, and the like, where the horses are attached at one side of the machine or where the horses are unequally attached upon opposite sides of the draft-tongue; and the invention consists in certain novel features of the construction, as hereinafter shown and described, and specifically pointed out in the claims.

In the drawings illustrative of the invention the figure represents a plan view attached to a portion of a conventional harvester-frame.

The device may be attached to any form of agricultural machinery wherein the horses are attached at one side of the center of gravity or central draft-line, such as harvesters, mowing-machines, some forms of plows, and the like.

In the drawing, 10 represents a portion of the framework of such a machine, and 11 the usual draft-tongue.

In the invention is comprised an evener-beam 12, having a clip 13 connected centrally thereto and extending rearwardly, having chains or other flexible connecting means 14 15 diverging therefrom, as shown. The chain 14 is extended to the frame 10 at a point on the opposite side of the tongue 11 from the clip 13 and connected to the frame 10 at 16, while the chain 15 is extended in the opposite direction and coupled to the frame 10 at 17 on the same side of the tongue as the clip 13. Within the connection 15, between the clip 13 and the coupling 17, is disposed a spring 18, which renders the connection 15 yieldable longitudinally. Attached to the ends of the evener-beam are doubletrees 19 20, each with its set of singletrees 21 22, respectively. The beam 12 will be extended with one end beneath the tongue 11 and with the clevis 23, by which the doubletree 20 is coupled thereto, in a substantially central line beneath the tongue, as indicated by dotted lines, which brings one of the singletrees 22 on one side of the tongue and all the other singletrees on the opposite side of the tongue, so that three horses will travel upon one side of the tongue and one horse only on the other or "grain" side.

The whole attachment is entirely clear of the tongue 11 and has no connection whatever with it, so that when slacked up the evener-bar 12 and all its attachments will drop to the ground.

The length of the evener-bar 12 will be so proportioned that the four horses will be properly spaced, the horses adjacent to the tongue evenly divided by the tongue and at one end of the beam and the other two horses equidistant from the center of the beam and on the other side of the clip 13.

The proportionate distances between the tongue 11 and the coupling-point 16 and the tongue and coupling-point 17 will be so proportioned that the proper differential leverage will be maintained between the long or grain side of the machine and the short or "land" side, so that the long leverage of the part from 11 to 17 will counteract the long leverage of the grain side, and thus equalize the draft.

The long leverage of the draft-chain 15 being disposed to act upon the short or land end of the machine and the short leverage of the draft-chain 14 being disposed to act upon the long or grain end will exactly "balance," so that the draft will be exactly equalized and the side draft eliminated.

The spring 18 affords a yielding connection on the short or land side of the machine and the long side of the leverage exerted by the beam 12 and its attachments to cause the machine to at once automatically adapt itself to any change of conditions or increase or decrease of the draft which may be caused by the machine running over uneven ground or one or the other of the wheels meeting obstructions. The device will thus automatically adapt itself to irregularity of surface or increase or decrease the pressure from any cause.

The parts may be constructed of any size or proportion to adapt the device to different kinds of machines or machines employed for different purposes and may be modified in minor particulars without affecting the principle of the invention or sacrificing any of its advantages.

Having thus described my invention, what I claim is—

1. In a draft-equalizer, the combination with the vehicle of the draft-tongue located at one side of the center, an evener-beam located at the "land" side of said tongue and extending partially beneath it, a flexible draft means connecting said beam centrally with the grain side of said vehicle comparatively near the tongue, a flexible draft means connecting said beam centrally with the "land" side of said vehicle at a comparatively remote distance from the tongue, means carried by said evener-beam for coupling the horses thereto with one horse upon the grain side of the tongue and the remaining horses upon the land side of the tongue, substantially as described.

2. In a draft-equalizer, the combination with the vehicle of the draft-tongue located at one side of the center, an evener-beam located at the "land" side of said tongue and extending partially beneath it, a flexible draft means connecting said beam centrally with the grain side of said vehicle comparatively near the tongue, a yieldable flexible draft means connecting said beam centrally with the "land" side of said vehicle at a comparatively remote distance from the tongue, means carried by said evener-beam for coupling the horses thereto with one horse upon the grain side of the tongue and the remaining horses upon the land side of the tongue, substantially as described.

3. In a draft-equalizer, the combination of a harvester, a draft-tongue located at one side of the center of said harvester, an evener-beam located at the land side of said tongue and extending partially beneath it, a flexible draft means connecting said beam centrally with the grain side of said machine comparatively near the tongue, a flexible draft means connecting said beam centrally to said harvester at a comparatively remote distance from the tongue, a spring connected into said "land" side draft means, means carried by said evener-beam for coupling the horses thereto with one horse upon the "grain" side of the tongue and the remaining horses upon the "land" side of the tongue, substantially as described.

In testimony that I claim the foregoing as my own I have hereto affixed my signature in the presence of two witnesses.

NELSON E. BAILEY.

Witnesses:
  W. H. COLE,
  J. G. BEAVER.